(12) United States Patent
Niehaus et al.

(10) Patent No.: US 12,505,164 B2
(45) Date of Patent: Dec. 23, 2025

(54) METHOD OF ENCODING TERRAIN DATABASE USING A NEURAL NETWORK

(71) Applicant: Rockwell Collins, Inc., Cedar Rapids, IA (US)

(72) Inventors: Ryan L. Niehaus, Cedar Rapids, IA (US); Gaurav Srivastava, Hyderabad (IN); Christopher A. Scherer, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 18/614,343

(22) Filed: Mar. 22, 2024

(65) Prior Publication Data
US 2025/0181645 A1   Jun. 5, 2025

(30) Foreign Application Priority Data

Dec. 5, 2023   (IN) .............................. 202311082812

(51) Int. Cl.
| | | |
|---|---|---|
| *G06F 16/00* | (2019.01) | |
| *G06F 16/9032* | (2019.01) | |
| *G06F 16/909* | (2019.01) | |
| *G06N 3/045* | (2023.01) | |

(52) U.S. Cl.
CPC ........ *G06F 16/9032* (2019.01); *G06F 16/909* (2019.01); *G06N 3/045* (2023.01)

(58) Field of Classification Search
None
See application file for complete search history.

(56) References Cited

U.S. PATENT DOCUMENTS

| | | |
|---|---|---|
| 4,715,005 A | 12/1987 | Heartz |
| 10,922,882 B2 | 2/2021 | Liu et al. |
| 2007/0247350 A1 | 10/2007 | Ryan |
| 2017/0011089 A1* | 1/2017 | Bermudez Rodriguez ................. G06F 16/9537 |
| 2023/0075840 A1 | 3/2023 | Chenchu et al. |

(Continued)

FOREIGN PATENT DOCUMENTS

| | | | |
|---|---|---|---|
| CN | 116797749 A | * | 9/2023 |
| EP | 2067123 B1 | | 4/2018 |
| WO | 2021042208 A1 | | 3/2021 |

OTHER PUBLICATIONS

European Search Report received in EP Application No. 24207624.8, Apr. 9, 2025, 9 pages.

*Primary Examiner* — Tuankhanh D Phan
(74) *Attorney, Agent, or Firm* — Suiter Swantz IP (57) ABSTRACT

A system is disclosed. The system may include a display and one or more controllers communicatively coupled to the display. The one or more controllers may include one or more processors configured to execute a set of program instructions stored in a memory. The set of program instructions may be configured to cause the one or more processors to receive a neural network configured to output elevation data based on a plurality of queries and base resolution elevation data corresponding to a terrain area as the plurality of queries. Each query may correspond to a queried location of the terrain area. The one or more processors may be configured to input each query to the neural network to output the elevation data corresponding to the queried location. The one or more processors may be configured to direct the elevation data to be displayed on the display.

16 Claims, 7 Drawing Sheets

(56) References Cited

U.S. PATENT DOCUMENTS

2023/0092122 A1     3/2023   Kulp et al.
2024/0428691 A1*   12/2024   S ............................. G08G 5/51

* cited by examiner

METHOD OF ENCODING TERRAIN DATABASE USING A NEURAL NETWORK

CROSS-REFERENCE TO RELATED APPLICATIONS

The present application claims the benefit of India Provisional Patent Application 20/231,1082812, filed Dec. 5, 2023, titled METHOD OF ENCODING TERRAIN DATABASE USING A NEURAL NETWORK, naming Ryan L. Niehaus, Gaurav Srivastava, and Christopher A. Scherer as inventors, which is incorporated herein by reference in the entirety.

TECHNICAL FIELD

The present disclosure related generally to the field of aerospace data management and, more particularly, to the optimization of terrain database storage and usage within aircraft systems.

BACKGROUND

Contemporary terrain databases employed in aircraft systems are constructed from an evenly-gridded array of elevation posts. This data, typically compressed via conventional compression methodologies, can consume multiple gigabytes of storage capacity. This necessitates substantial storage space and often relies on dedicated hardware for data storage and retrieval on legacy systems.

Therefore, there is a need for a system and method that can provide efficient, high-speed loading of terrain database within aircraft systems, while still providing the resolution needed.

SUMMARY

A system is disclosed in accordance with one or more illustrative embodiments of the present disclosure. In one illustrative embodiment, the system may include a display and one or more controllers communicatively coupled to the display. In another illustrative embodiment, the one or more controllers may include one or more processors configured to execute a set of program instructions stored in a memory. In another illustrative embodiment, the set of program instructions may be configured to cause the one or more processors to receive a neural network configured to output elevation data based on a plurality of queries. In another illustrative embodiment, the one or more controllers may be configured to input each query to the neural network to output the elevation data corresponding to the queried location and direct the elevation data to be displayed on the display.

In a further aspect, the one or more controllers may be configured to receive base resolution elevation data and input at least a portion of the base resolution elevation data with the each query to output the elevation data. In another illustrative embodiment, the base resolution elevation data may have a lower resolution than the elevation data. In another illustrative embodiment, the query may include a latitude and a longitude. In another illustrative embodiment, the elevation data may include a single data point corresponding to a single height such that the queried location is a point location. In another illustrative embodiment, the elevation data may include multiple data points corresponding to multiple heights such that the queried location is an area location.

In a further aspect, the one or more controllers may be further configured to train the neural network. In another illustrative embodiment, the training of the neural network may include receiving a training terrain database including a plurality of input training locations that correspond to a plurality of output training elevation points and training the neural network based on the input training locations and the plurality of output training elevation points. In another illustrative embodiment, the training of the neural network may include a first training of a first neural network, a second training of a second neural network, where the second neural network is configured to output a second resolution that is higher than a first resolution of the first neural network, and merging the first neural network and the second neural network, wherein the neural network includes the merged first neural network and the second neural network.

In a further aspect, the one or more controllers may be further configured to perform multiple training iterations, each training iteration including the training of the neural network and a validation of the neural network compared to a difference between the plurality of output training gridded elevation points and a corresponding elevation point of the elevation data that is output by the neural network. In another illustrative embodiment, the validation may be based on an acceptable validation threshold.

A method is disclosed in accordance with one or more illustrative embodiments of the present disclosure. In one illustrative embodiment, the method may include receiving a neural network configured to output elevation data based on a plurality of queries. In another illustrative embodiment, the method may include inputting each query to the neural network to output the elevation data corresponding to the queried location. In another illustrative embodiment, the method may include directing the elevation data to be displayed on a display. In another illustrative embodiment, the method may include receiving base resolution elevation data and inputting at least a portion of the base resolution elevation data with the each query to output the elevation data.

In a further aspect, the method may include training the neural network. In another illustrative embodiment, the training of the neural network may include receiving a training terrain database comprising a plurality of input training locations that correspond to a plurality of output training elevation points and training the neural network based on the input training locations and the plurality of output training elevation points. In another illustrative embodiment, the method may include performing multiple training iterations. In another illustrative embodiment, each training iteration may include the training of the neural network and a validating of the neural network compared to a difference between the plurality of output training gridded elevation points and a corresponding elevation point of the elevation data that is output by the neural network. In another illustrative embodiment, the validation may be based on an acceptable validation threshold.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments of the inventive concepts disclosed herein are directed to a system and method for generating terrain elevation data using a neural network. In one or more embodiments, a query (e.g., latitude and longitude coordinates of a location) are input into a neural network configured to generate elevation data (e.g., height) for the queried location. In one or more embodiments, both a query (e.g., latitude and longitude coordinates of a location) and a lower resolution elevation data of the location are input into a neural network, such that the neural network is aided by the lower resolution data and generates a higher resolution data. This approach provides a compressed way to store and retrieve terrain elevation data, such as may be used by aircraft flight management systems. This may reduce the need for specialized larger storage systems for the terrain data and reduces the time it takes for an aircraft to download the terrain data.

Embodiments may be used with a High-Resolution Terrain Production Database (HRTDb).

The elevation data of at least some embodiments herein may be characterized as a sampling of a continuous function encompassing all elevations of an area, such as the entire area of the earth.

Previous methods of terrain database loading of 3 arcsecond higher resolution data, for example, may be on the order of 22 gigabytes (GB) and take 12-18 hours to load on legacy aircraft systems, and require a special PC for loading as well as a special dedicated hardware for storing the data on the legacy system.

Neural networks may be used to reduce a geospatial database to a parametric equation. This process involves training a neural network to learn the underlying patterns and relationships within the geospatial data and then using the network to generate a parametric equation that approximates the data.

The geospatial database may be preprocessed by organizing and formatting the data in a suitable manner for training a neural network. This may involve converting coordinates, normalizing values, and splitting the dataset into training and testing subsets.

A neural network architecture suitable for the task may be designed. Depending on the nature and complexity of the geospatial data, different types of neural networks, such as feedforward neural networks, recurrent neural networks, or convolutional neural networks, may be employed.

The neural network may be trained using the geospatial data. The neural network learns to approximate the data patterns and relationships during the training process. The loss function used during training should be chosen based on the specific problem and desired output (e.g., regression loss for continuous output).

Once the neural network is trained, it may be used to generate a parametric equation that approximates the geospatial data. This may be achieved by extracting the neural network contents (e.g., learned weights and biases) and representing the contents as coefficients of a parametric equation. The exact form of the equation will depend on the problem and the specific outputs predicted by the neural network. For example, the parametric equation may be an equation that includes or is the weights and interconnection between all nodes of the neural network itself.

Figure 1A:
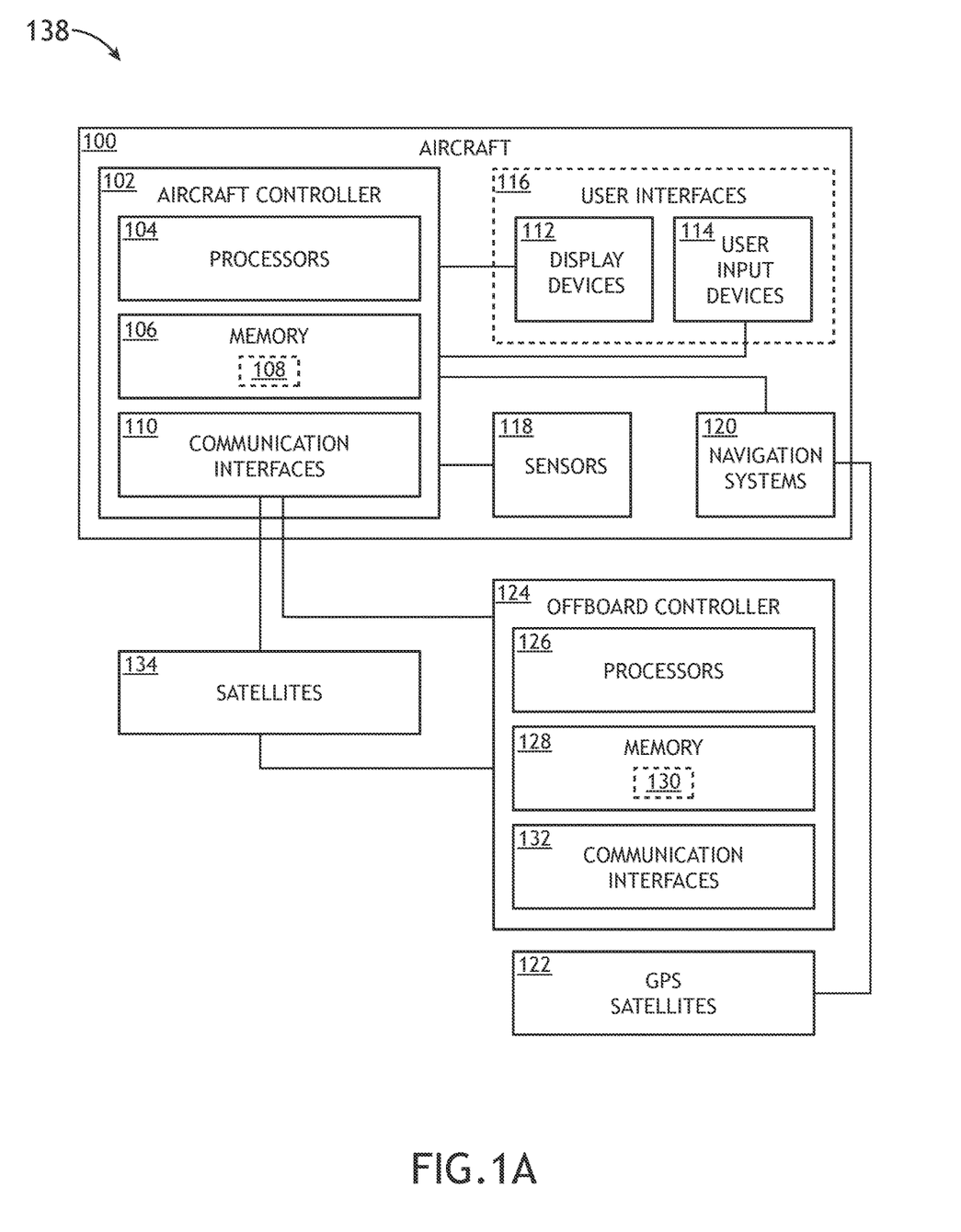
FIG. 1A illustrates a simplified block diagram of an aircraft including a system, in accordance with one or more embodiments of the present disclosure.
Figure 1B:
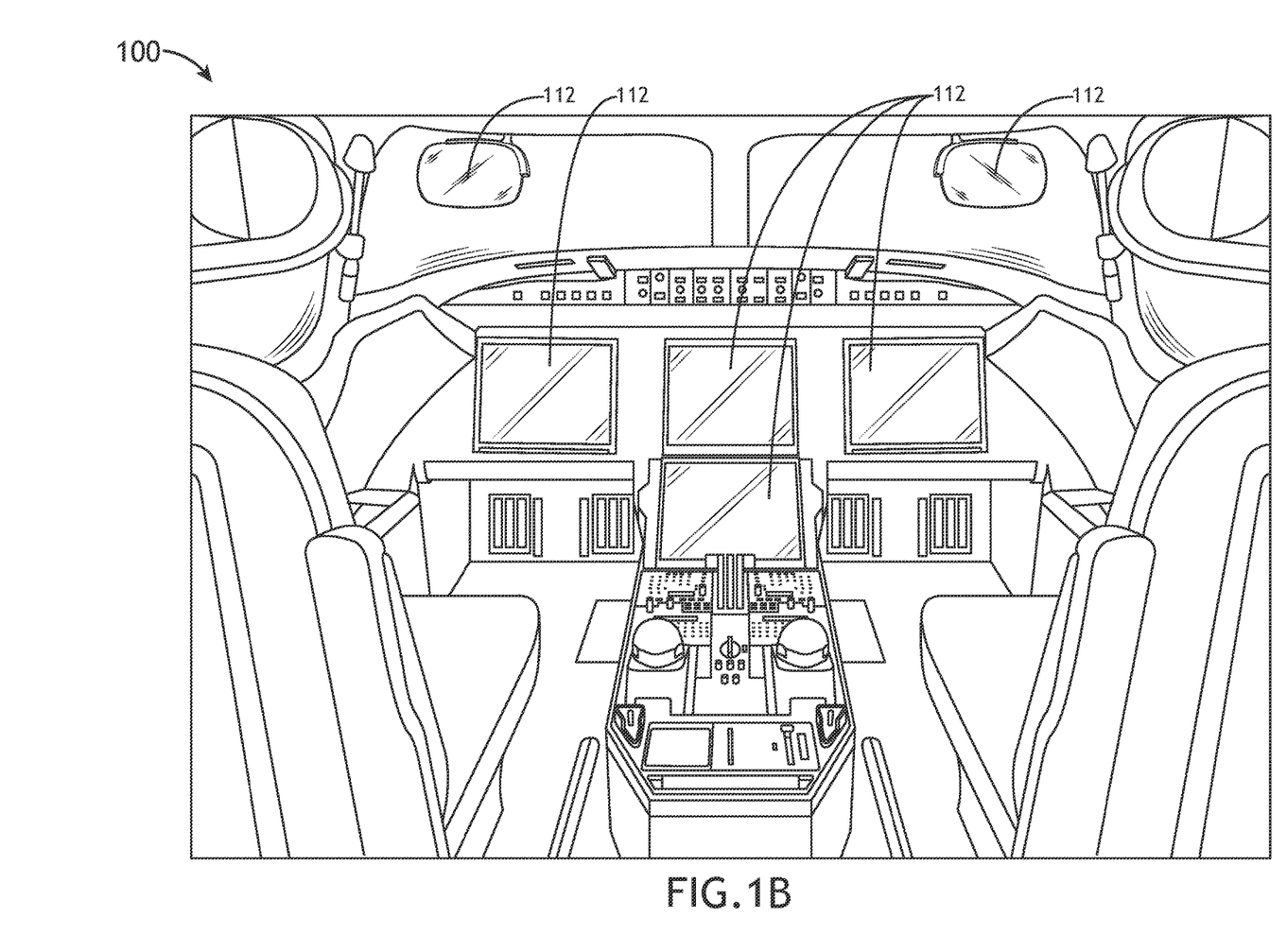
FIG. 1B illustrates an aircraft including a system, in accordance with one or more embodiments of the present disclosure.

FIGS. 1A-1B illustrate an aircraft including g a system for storing, generating/retrieving, and the like of terrain elevation data, in accordance with one or more embodiments of the present disclosure.

Referring now to FIG. 1A, the aircraft 100 may include an aircraft controller 102 (e.g., on-board/run-time controller). The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images and/or two-dimensional images. Referring now to FIG. 1B, the avionics environment (e.g., the cockpit) may include any number of display devices 112 (e.g., one, two, three, or more displays) such as, but not limited to, one or more head-down displays (HDDs)

112, one or more head-up displays (HUDs) 112, one or more multi-function displays (MFDs), one or more adaptive flight displays (AFDs) 112, one or more primary flight displays (PFDs) 112, or the like. The one or more display devices 112 may be employed to present flight data including, but not limited to, situational awareness data (e.g., elevation data) and/or flight queue data to a pilot or other crew member. For example, the situational awareness data (e.g., elevation data) may be based on, but is not limited to, aircraft performance parameters, aircraft performance parameter predictions, sensor readings, alerts, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130 and/or one or more communication interfaces 132.

The aircraft controller 102 and/or the one or more offboard controllers 124 may be coupled (e.g., physically, electrically, and/or communicatively) to one or more satellites 134. For example, the aircraft controller 102 and/or the one or more offboard controllers 124 may be coupled (e.g., physically, electrically, and/or communicatively) to one another via the one or more satellites 134. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 134 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, Boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2A:
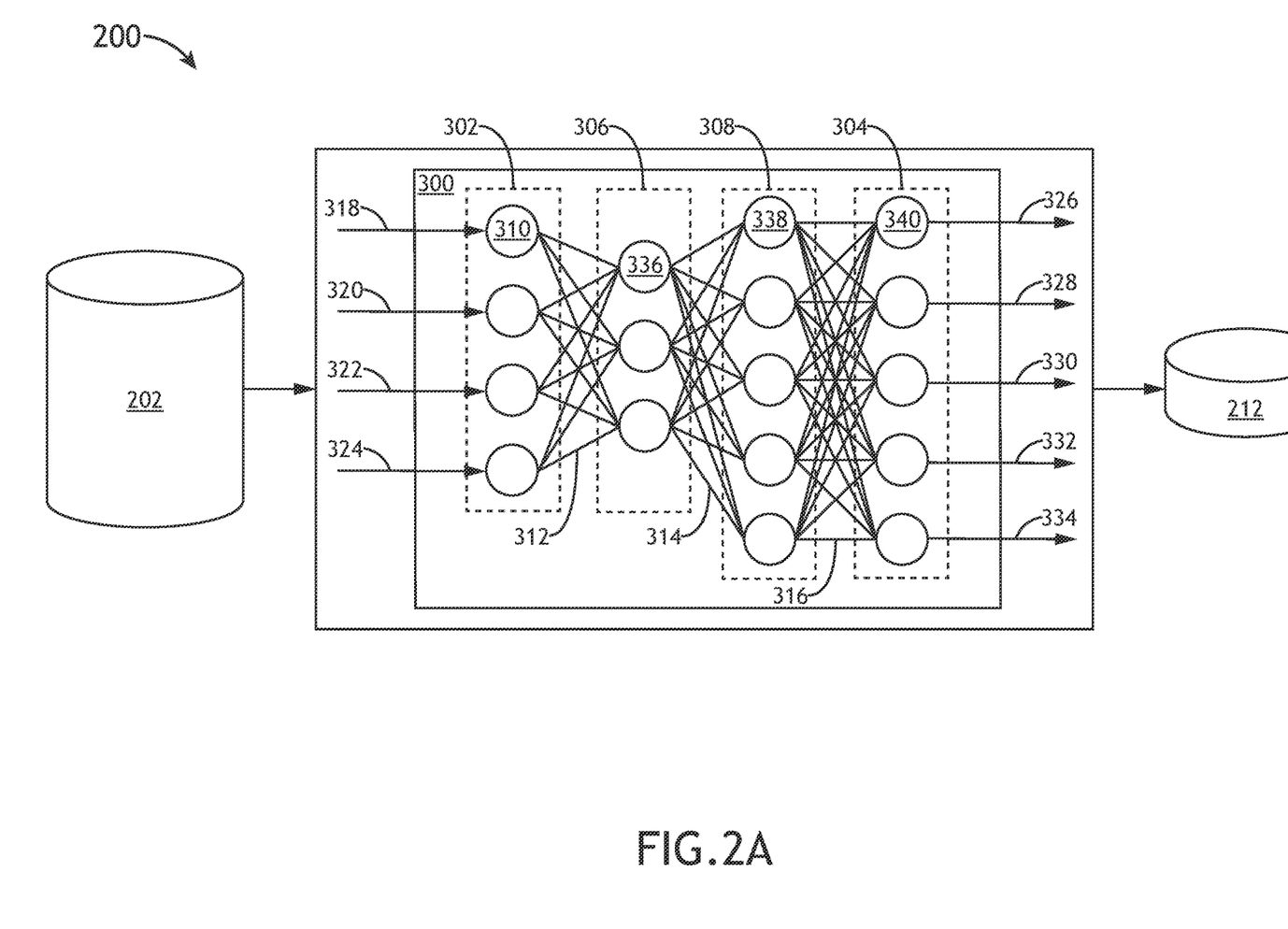
FIG. 2A is a conceptual block diagram of training a neural network configured to output elevation data, in accordance with one or more embodiments of the present disclosure.

FIG. 2A illustrates a conceptual block diagram 200 of training a neural network 300 configured to output elevation data, in accordance with one or more embodiments of the present disclosure. See FIG. 2B for an example illustration of elevation data 206 (e.g., terrain tile height data, and/or the like).

The training may include iteratively improving a neural network 300 to generate/refine/train a (trained) neural network 212. For example, the training may be based on a training terrain database 202 (e.g., (training) elevation data at one or more resolutions). The training terrain database 202 may include, but is not necessarily limited to, ground truth data of paired locations (e.g., coordinates) and elevations at those locations.

Figure 2B:
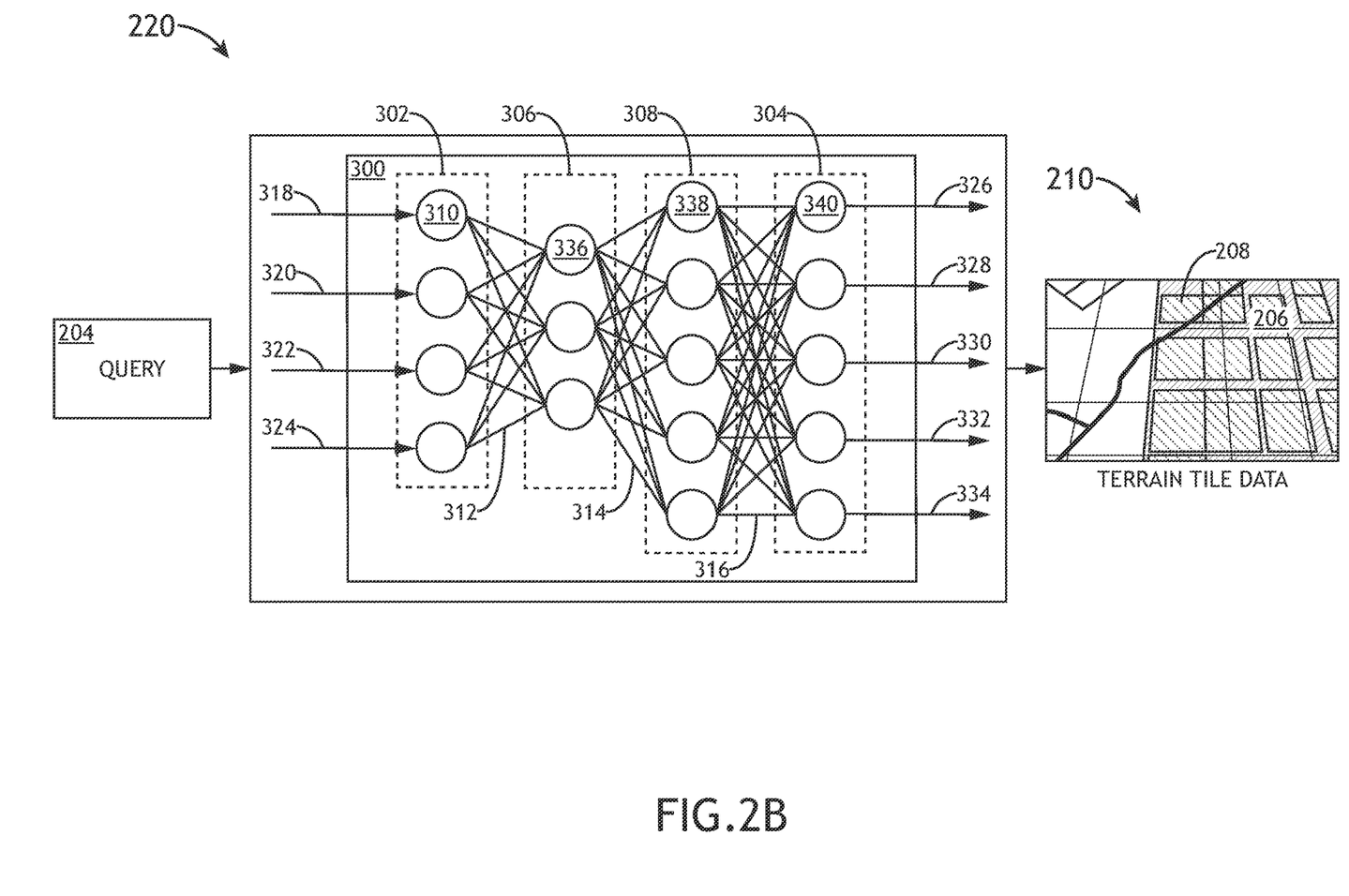
FIG. 2B is a conceptual block diagram of using the neural network of FIG. 2A to output elevation data based on a query, in accordance with one or more embodiments of the present disclosure.

FIG. 2B illustrates a conceptual block diagram 220 of using the neural network 300 of FIG. 2A to output elevation data 206 based on a query 204, in accordance with one or more embodiments of the present disclosure.

Figure 4:
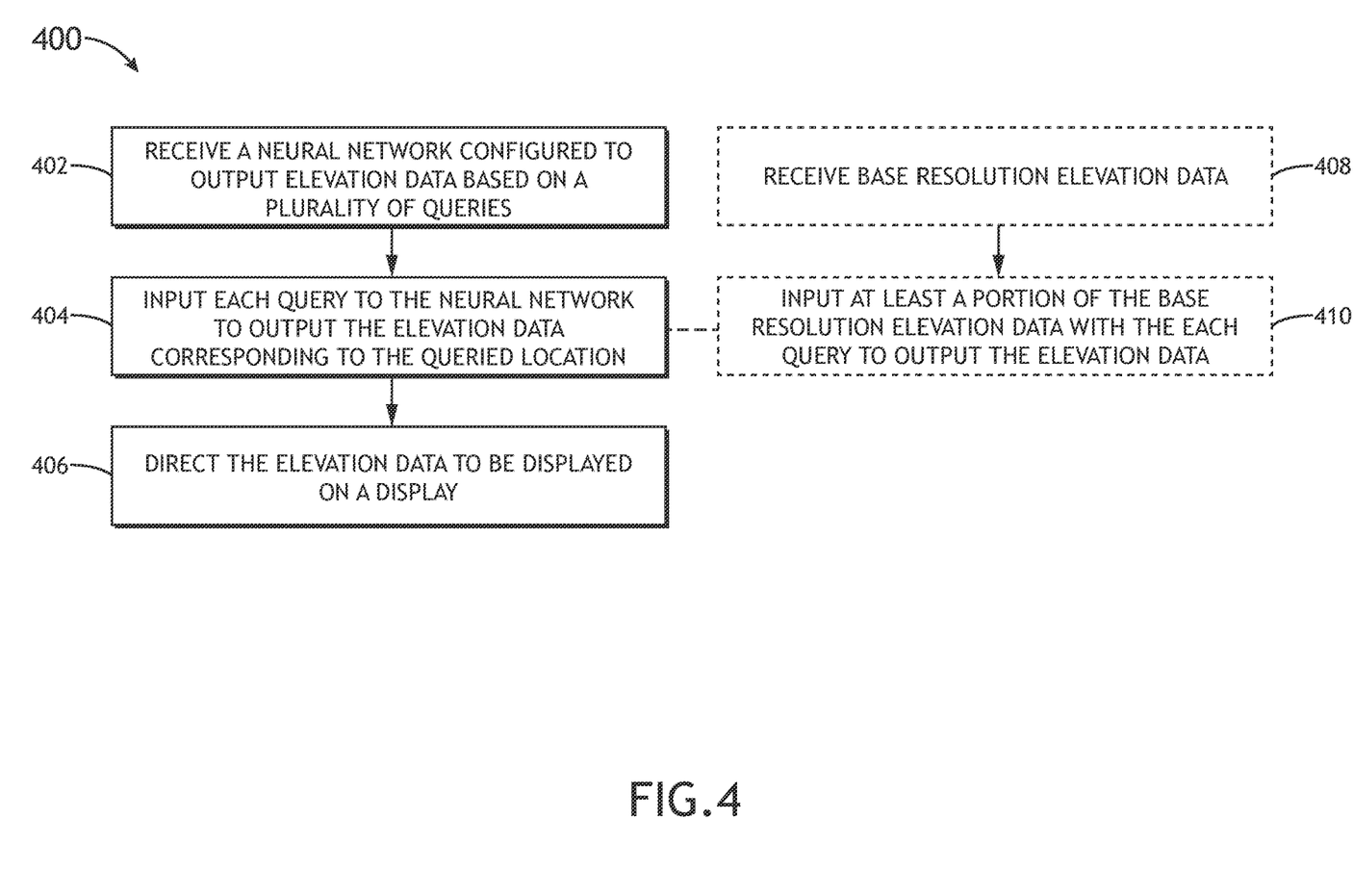
FIG. 4 is a flow diagram illustrating steps performed in a method for displaying elevation data, in accordance with one or more embodiments of the present disclosure.

In embodiments, method 400 of FIG. 4 or the like may be used for querying the neural network 300.

For example, a query (e.g., latitude and longitude) of a queried location may be sent as inputs to neural network 300 and run-time inference of the neural network 300 may be used to output (e.g., generate) one or more elevation data 206. For instance, the elevation data 206 may be a height (e.g., 25 meters above sea level) that corresponds to the height of a tile 208 of a gridded set of tiles 208 of elevation data 206 of a terrain area 210.

Figure 3A:
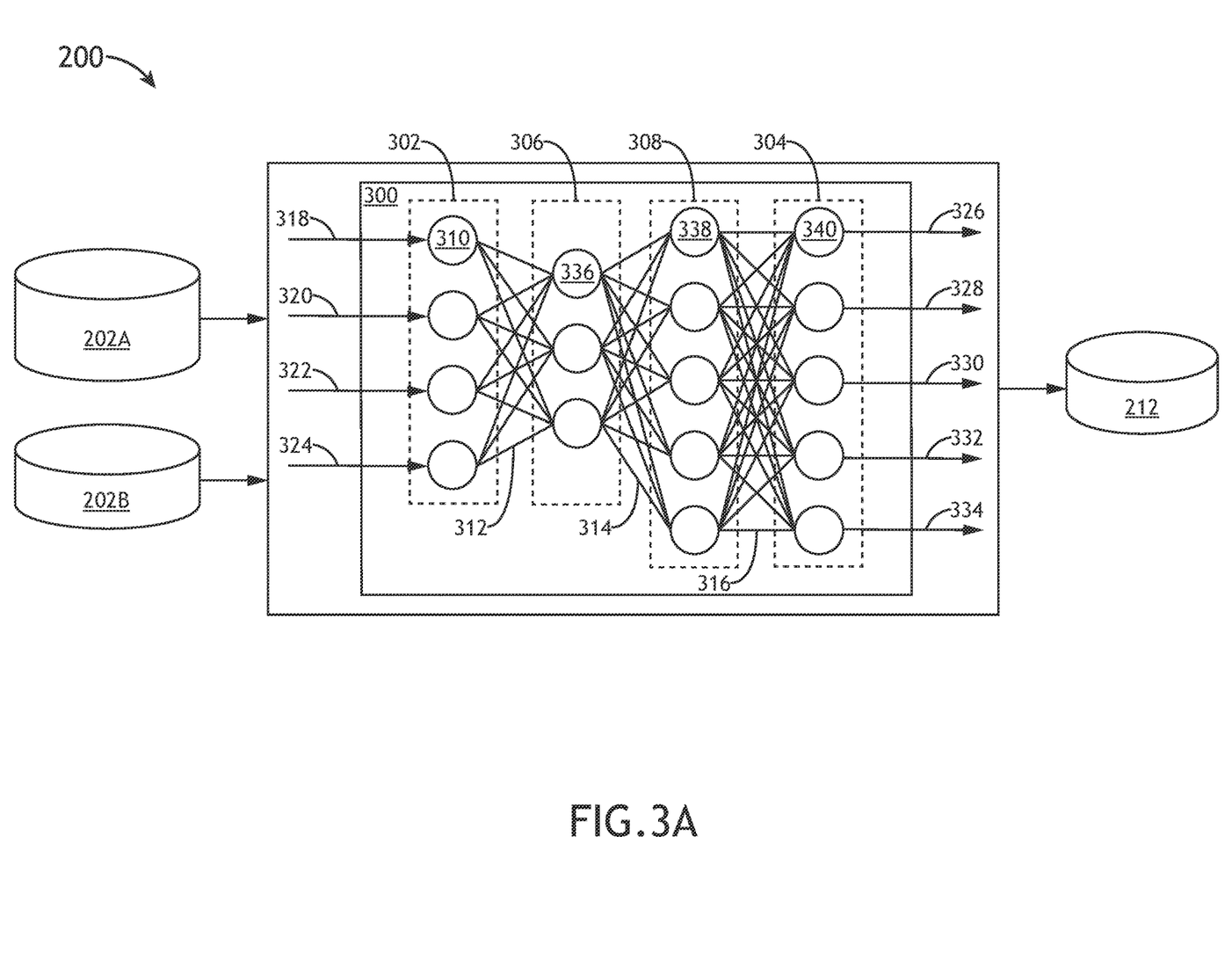
FIG. 3A is a conceptual block diagram of training a neural network configured to output elevation data based on base resolution elevation data and higher resolution elevation data, in accordance with one or more embodiments of the present disclosure.
Figure 3B:
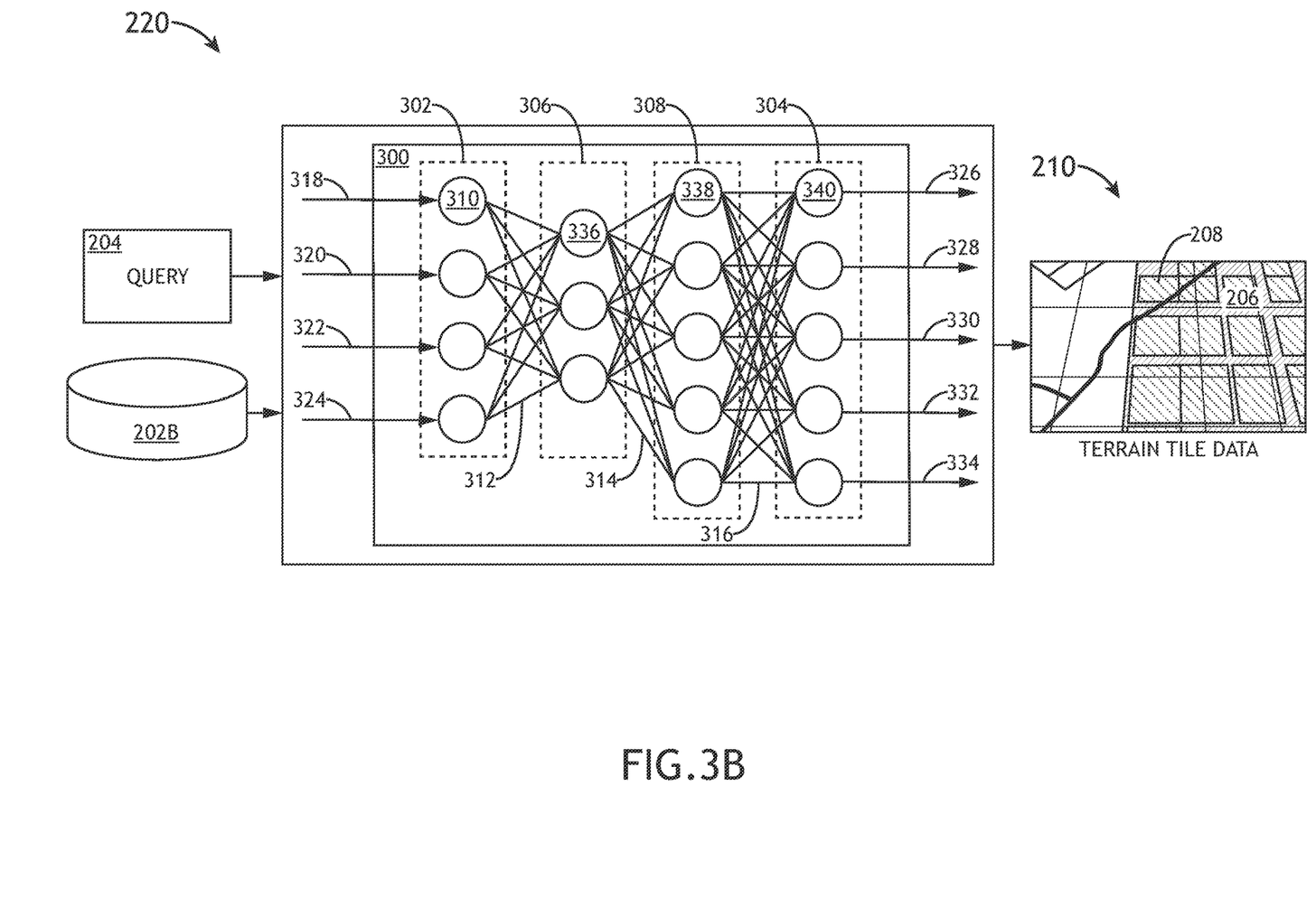
FIG. 3B is a conceptual block diagram of using the neural network of FIG. 3A to output elevation data based on a query and at least a portion of the base resolution elevation data, in accordance with one or more embodiments of the present disclosure.

FIGS. 3A and 3B illustrate training and using, respectively, a neural network 300 configured to internally model a difference between a base (lower) resolution elevation data and a higher resolution elevation data.

FIG. 3A illustrates a conceptual block diagram 260 of training a neural network 300 configured to output elevation data 206 based on base resolution elevation data 202B and elevation data 202A (e.g., relatively higher resolution than data 202B), in accordance with one or more embodiments of the present disclosure. FIG. 3B illustrates a conceptual block diagram 280 of using the neural network 300 of FIG. 3A to output elevation data 206 based on a query 204 and at least a portion of the base resolution elevation data 202B, in accordance with one or more embodiments of the present disclosure.

As described below for step 408 and step 410 of FIG. 4, during run-time of FIG. 3B, at least a portion of a base resolution elevation data 202B may be input along with each query 204 to output the elevation data 206. This may provide a tradeoff compared to a pure neural network approach or pure non-neural network approach of storing data in arrays or the like, while still achieving desired compression levels and relatively high resolutions and accuracy.

FIG. 4 illustrates a flow diagram illustrating steps performed in a method 400 for displaying elevation data, in accordance with one or more embodiments of the present disclosure. Systems 138, controllers 102, 124 and/or the like herein may be configured to perform one or more steps of the method 400. However, note that the method 400 is not necessarily limited to be performed by the system 138 of FIG. 1A and may be performed in a variety of ways.

At step 402, a neural network 300 configured to output elevation data 206 based on a plurality of queries 204 is received (e.g., uploaded to an aircraft). Each query 204 corresponds to a queried location (e.g., one or more tile 208 locations) of a terrain area (e.g., a grid of tiles 208, points, or the like).

At step 404, each query 204 is input to the neural network 300 to output the elevation data corresponding to the queried location. For example, during run-time (e.g., while flying, such as approaching a runway or flying over mountains), the neural network 300 may be queried to generate a map based on the elevation data 206. The querying may be done one point location at a time, or for an area at a time. For example, the elevation data 206 may include a single data point (e.g., 25) corresponding to a single height (e.g., 25 meters above sea level) such that the queried location is a point location. For example, the elevation data 206 may include multiple data points (e.g., a grid of 5 by 5 data points centered on the queried location for faster querying and received as a sequence of 25 data points) corresponding to multiple heights (e.g., 25 corresponding heights) such that the queried location is an area location.

At step 406, the elevation data 206 is displayed (e.g., directed to be displayed by controller 102) on a display 112. For example, a software program stored on memory 106 may be configured to use the elevation data 206 (e.g., set of height data corresponding to location coordinates) to generate a moving map for increased situational awareness of pilots. The moving map may be rendered and directed to be displayed by directing a transmission of the rendering to the display 112. In some embodiments, the controller 102 is configured to issue a warning (e.g., audio and/or visual alert on display) to a pilot based on the elevation data 206 (e.g., when the aircraft 100 is approaching an incline (e.g., mountain) above a (particular) elevation change threshold (e.g., more than 50 meters)). The alert may be based on a known elevation of the aircraft 100 and the elevation data 206 generated using the neural network 300.

At step 408 and step 410, base resolution elevation data (e.g., see base resolution elevation data 202B of FIG. 3B) is received (e.g., known and stored on memory) and at least a portion of the base resolution elevation data 202B is input along with each query 204 to output the elevation data 206.

For example, the portion may include one or more data points (e.g., the same and/or adjacent elevation data points) that correspond to the same queried location of the query 204. For instance, at least conceptually, the inputs may be of the form: (query: [latitude number], [longitude number]; base resolution elevation data: [a single elevation point corresponding to the queried location]). Lower resolution means, unless otherwise noted, lower spatial resolution. For example, the base resolution elevation data 202B may include an arcsecond resolution that is different (e.g., lower) than an arcsecond resolution configured to be output by the neural network 300. For instance, the base resolution elevation data 202B may be a 9 arcsecond resolution (or worse/higher, which is a lower resolution), and the elevation data 206 may be output at a 3 arcsecond resolution (or better/lower, which is a higher resolution); and/or the like. If the base resolution elevation data 202B is lower resolution, each point may cover a larger area such that the same base resolution elevation data 202B point is used with a few different neighboring queried locations that are nearest to that same base resolution elevation data 202B point. Because the neural network 300 is trained on higher resolution data, it can output different higher resolution elevation data for the neighboring queried locations.

For example, a system 138 may be configured to use a combination of lower resolution elevation data 202B (e.g., stored in conventional ways such as in an array) and a neural network 300 trained and therefore configured to generate (higher resolution) elevation data 206 based on the lower resolution elevation data 202B. This approach may reduce the memory space needed to have access to high resolution elevation data during runtime, compared to the memory needed to store high resolution data as a conventional array.

The method 400, may include training the neural network 300. FIGS. 2A and 3A are examples of training.

The training of the neural network 300 may include receiving a training terrain database 202 comprising a plurality of input training locations (e.g., coordinates) that correspond to (e.g., are paired with in a table) to a plurality of output training elevation points (e.g., normalized heights; heights above sea level; differences in height from base resolution elevation data; and/or the like). The training of the neural network 300 may include training the neural network 300 based on the input training locations and the plurality of output training elevation points, to reduce the loss.

In some embodiments, the training of the neural network 300 includes a first training of a first neural network 300 (e.g., using training data at a lower resolution such as 9 arcseconds), and a second training of a second neural network 300 (e.g., using training data at a higher resolution such as 3 arcseconds). In this way, the second neural network 300 is configured to output a second resolution that is higher than a first resolution of the first neural network 300.

In at least one embodiment, multiple neural networks 300 (e.g., the first and the second neural network each trained on a different resolution of terrain elevation data 202) may be merged (e.g., merged into one combined neural network 300 by connecting outputs 326 (e.g., elevation data 206) from the first neural network to inputs 318 of the second neural network and/or the like). In this way, the first neural network and the second neural network may be merged, where the neural network comprises the merged first neural network and the second neural network. This could be used to increase the resolution from one neural network to the next.

In at least one embodiment, outputs 206 from respective multiple neural networks 300 (e.g., the first and the second neural network each trained on a different resolution of terrain elevation data) may be merged (e.g., added, averaged, and/or the like).

The method may include performing multiple training iterations, each training iteration comprising the training of the neural network 300 and a validating of the neural network 300. The validating may be configured to ensure an accuracy of the elevation data 206. The validating may compare a difference between the plurality of input training elevation points 202 (e.g., actual elevation, ground truth) and a corresponding elevation point of the elevation data 206 that is output by the neural network 300. The validation may be based on an acceptable validation threshold (e.g., within a height threshold, such as within 10 meters error, within 5 meters error, and/or the like).

Referring back to FIGS. 2A to 3B, a block diagram of a neural network 300 according to embodiments of the inventive concepts disclosed herein is shown. The neural network 300 comprises an input layer 302 that receives external inputs (including query 204 and may include a portion of base resolution elevation data 202B as shown in FIG. 3B), and output layer 304, and a plurality of internal layers 306, 308. Each layer comprises a plurality of neurons or nodes 310, 336, 338, 340. In the input layer 302, each node 310 receives one or more inputs 318, 320, 322, 324 corresponding to a digital signal and produces an output 312 based on an activation function unique to each node 310 in the input layer 302. An activation function may be a hyperbolic tangent function, a linear output function, and/or a logistic function, or some combination thereof, and different nodes 310, 336, 338, 340 may utilize different types of activation functions. In at least one embodiment, such activation function comprises the sum of each input multiplied by a synaptic weight. The output 312 may comprise a real value with a defined range or a Boolean value if the activation function surpasses a defined threshold. Such ranges and thresholds may be defined during a training process. Furthermore, the synaptic weights are determined during the training process.

Outputs 312 from each of the nodes 310 in the input layer 302 are passed to each node 336 in a first intermediate layer 306. The process continues through any number of intermediate layers 306, 308 with each intermediate layer node 336, 338 having a unique set of synaptic weights corresponding to each input 312, 314 from the previous intermediate layer 306, 308. It is envisioned that certain intermediate layer nodes 336, 338 may produce a real value with a range while other intermediate layer nodes 336, 338 may produce a Boolean value. Furthermore, it is envisioned that certain intermediate layer nodes 336, 338 may utilize a weighted input summation methodology while others utilize a weighted input product methodology. It is further envisioned that synaptic weight may correspond to bit shifting of the corresponding inputs 312, 314, 316.

An output layer 304 including one or more output nodes 340 receives the outputs 316 from each of the nodes 338 in the previous intermediate layer 308. Each output node 340 produces a final output 326, 328, 330, 332, 334 via processing the previous layer inputs 316, the final output 326, 328, 330, 332, 334 corresponding to elevation data that corresponds to the queried location. Such outputs may comprise separate components of an interleaved input signal, bits for delivery to a register, or other digital output based on an input signal and DSP algorithm.

In at least one embodiment, each node 310, 336, 338, 340 in any layer 302, 306, 308, 304 may include a node weight to boost the output value of that node 310, 336, 338, 340 independently of the weighting applied to the output of that node 310, 336, 338, 340 in subsequent layers 304, 306, 308. It may be appreciated that certain synaptic weights may be zero to effectively isolate a node 310, 336, 338, 340 from an input 312, 314, 316, from one or more nodes 310, 336, 338 in a previous layer, or an initial input 318, 320, 322, 324.

In at least one embodiment, the number of processing layers 302, 304, 306, 308 may be constrained at a design phase based on a desired data throughput rate. Furthermore, multiple processors and multiple processing threads may facilitate simultaneous calculations of nodes 310, 336, 338, 340 within each processing layers 302, 304, 306, 308.

Layers 302, 304, 306, 308 may be organized in a feed forward architecture where nodes 310, 336, 338, 340 only receive inputs from the previous layer 302, 304, 306 and deliver outputs only to the immediately subsequent layer 304, 306, 308, or a recurrent architecture, or some combination thereof.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system comprising:
a primary flight display (PFD) configured for an aircraft; and
one or more controllers communicatively coupled to the PFD including one or more processors configured to execute a set of program instructions stored in a memory, the set of program instructions configured to cause the one or more processors to:
receive a neural network configured to output elevation data based on a plurality of queries, wherein each query corresponds to a queried location of a terrain area;
receive base resolution elevation data corresponding to the terrain area;
input a portion of the base resolution elevation data along with each query to the neural network to output, using the neural network, the elevation data corresponding to the queried location, wherein the neural network is configured such that outputting of the elevation data is configured to use a combination of the portion of the base resolution elevation data and each query and wherein the elevation data is configured to have a resolution that is higher relative to a resolution of the base resolution elevation data, wherein the portion of the base resolution elevation data comprises at least one of:
one or more data points that correspond to the queried location of the terrain area; or
one or more adjacent elevation data points that correspond to a location adjacent to the queried location of the terrain area; and
direct the elevation data having the resolution that is higher relative to the resolution of the base resolution elevation data to be displayed on the PFD.

2. The system of claim 1, wherein the query comprises a latitude and a longitude.

3. The system of claim 1, wherein the elevation data comprises a single data point corresponding to a single height such that the queried location is a point location.

4. The system of claim 1, wherein the elevation data comprises multiple data points corresponding to multiple heights such that the queried location is an area location.

5. The system of claim 1, wherein the one or more controllers are further configured to:
train the neural network, wherein the training of the neural network comprises:
receiving a training terrain database comprising a plurality of input training locations that correspond to a plurality of output training elevation points; and
training the neural network based on the input training locations and the plurality of output training elevation points.

6. The system of claim 5, wherein the training of the neural network comprises:
a first training of a first neural network;
a second training of a second neural network, where the second neural network is configured to output a second resolution that is higher than a first resolution of the first neural network; and
merging the first neural network and the second neural network, wherein the neural network comprises the merged first neural network and the second neural network.

7. The system of claim 5, wherein the one or more controllers are further configured to perform multiple training iterations, each training iteration comprises the training of the neural network and a validation of the neural network compared to a difference between the plurality of output training elevation points and a corresponding elevation point of the elevation data that is output by the neural network.

8. The system of claim 7, wherein the validation is based on an acceptable validation threshold.

9. A method comprising:
receiving, via one or more controllers communicatively coupled to a primary flight display (PFD) configured for an aircraft, a neural network configured to output elevation data based on a plurality of queries, wherein each query corresponds to a queried location of a terrain area;
receiving base resolution elevation data corresponding to the terrain area;
inputting a portion of the base resolution elevation data along with each query to the neural network to output, using the neural network, the elevation data corresponding to the queried location, wherein the outputting of the elevation data is uses a combination of the portion of the base resolution elevation data and each query and wherein the elevation data has a resolution that is higher relative to a resolution of the base resolution elevation data, wherein the portion of the base resolution elevation data comprises at least one of:
one or more data points that correspond to the queried location of the terrain area; or
one or more adjacent elevation data points that correspond to a location adjacent to the queried location of the terrain area; and
directing the elevation data to be displayed on the PFD configured for the aircraft.

10. The method of claim 9, wherein the query comprises a latitude and a longitude.

11. The method of claim 9, wherein the elevation data comprises a single data point corresponding to a single height such that the queried location is a point location.

12. The method of claim 9, wherein the elevation data comprises multiple data points corresponding to multiple heights such that the queried location is an area location.

13. The method of claim 9, further comprising:
training the neural network, wherein the training of the neural network comprises:
receiving a training terrain database comprising a plurality of input training locations that correspond to a plurality of output training elevation points; and
training the neural network based on the input training locations and the plurality of output training elevation points.

14. The method of claim 13, wherein the training of the neural network comprises:
a first training of a first neural network;
a second training of a second neural network, where the second neural network is configured to output a second resolution that is higher than a first resolution of the first neural network; and
merging the first neural network and the second neural network, wherein the neural network comprises the merged first neural network and the second neural network.

15. The method of claim 13, further comprising:
performing multiple training iterations, each training iteration comprises the training of the neural network and a validating of the neural network compared to a difference between the plurality of output training gridded elevation points and a corresponding elevation point of the elevation data that is output by the neural network.

16. The method of claim 15, wherein the validation is based on an acceptable validation threshold.

* * * * *